United States Patent
Kurokawa (10) Patent No.: US 8,120,668 B2
(45) Date of Patent: Feb. 21, 2012

(54) ELECTRONIC CAMERA FOR ADJUSTING A PARAMETER FOR REGULATING AN IMAGE QUALITY BASED ON THE IMAGE DATA OUTPUTTED FROM AN IMAGE SENSOR

(75) Inventor: Mitsuaki Kurokawa, Toyonaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 430 days.

(21) Appl. No.: 12/400,159

(22) Filed: Mar. 9, 2009

(65) Prior Publication Data

US 2009/0225186 A1 Sep. 10, 2009

(30) Foreign Application Priority Data

Mar. 7, 2008 (JP) .................................. 2008-058356

(51) Int. Cl.
*H04N 5/228* (2006.01)
(52) U.S. Cl. .................................. 348/222.1; 348/220.1
(58) Field of Classification Search ................ 348/220.1, 348/222.1, 320, 321, 322, 323, 349, 362, 348/364, 305, 312
See application file for complete search history.

(56) References Cited

U.S. PATENT DOCUMENTS

| | | | |
|---|---|---|---|
| 5,467,442 A | 11/1995 | Tsubota et al. | |
| 2001/0048474 A1* | 12/2001 | Yamazaki et al. | 348/207 |
| 2007/0018074 A1* | 1/2007 | Kinoshita | 250/208.1 |

FOREIGN PATENT DOCUMENTS

| | | |
|---|---|---|
| JP | 06-046247 A | 2/1994 |
| JP | 06-295171 A | 10/1994 |
| JP | 09-284660 A | 10/1997 |
| JP | 10-163883 A | 6/1998 |
| JP | 2002-064745 A | 2/2002 |
| JP | 2006-129240 A | 5/2006 |

* cited by examiner

*Primary Examiner* — Nelson D. Hernández Hernández
(74) *Attorney, Agent, or Firm* — Westerman, Hattori, Daniels & Adrian, LLP; William F. Westerman (57) ABSTRACT

An electronic camera includes a pre-processing block. The pre-processing block fetches four partial images outputted in a parallel manner from an image sensor in response to a clock CLK1 having a frequency equal to or less than 432 MHz, and performs four pre-processes that have responded to a clock CLK2 having a frequency ¼ the frequency of the clock CLK1, on each of the fetched four partial images. An image based on the processed four partial images is outputted from an LCD monitor. An evaluation-image producing circuit responds to a clock CLK3 so as to create an evaluation image based on the processed four partial images. A frequency of the clock CLK3 is adjusted in a range in which ¼ of 432 MHz is the upper limit. A parameter for regulating a quality of an output image is adjusted based on the evaluation image thus created.

5 Claims, 9 Drawing Sheets

30t

| MODE | Vsync | RESOLUTION | CLK1 | CLK2 | CLK3 |
|---|---|---|---|---|---|
| 0 | 1/15sec | 2880*2160 | 108MHz | 27MHz | 108MHz |
| 1 | 1/60sec | 2880*2160 | 432MHz | 108MHz | 108MHz |
| 2 | 1/60sec | 1440*1080 | 108MHz | 27MHz | 108MHz |
| 3 | 1/60sec | 960*720 | 54MHz | 13.5MHz | 54MHz |

| MODE | Vsync | RESOLUTION | CLK1 | CLK2 | CLK3 |
|---|---|---|---|---|---|
| 0 | 1/15sec | 2880*2160 | 108MHz | 27MHz | 108MHz |
| 1 | 1/60sec | 2880*2160 | 432MHz | 108MHz | 108MHz |
| 2 | 1/60sec | 1440*1080 | 108MHz | 27MHz | 108MHz |
| 3 | 1/60sec | 960*720 | 54MHz | 13.5MHz | 54MHz |

ELECTRONIC CAMERA FOR ADJUSTING A PARAMETER FOR REGULATING AN IMAGE QUALITY BASED ON THE IMAGE DATA OUTPUTTED FROM AN IMAGE SENSOR

CROSS REFERENCE OF RELATED APPLICATION

The disclosure of Japanese Patent Application No. 2008-58356, which was filed on Mar. 7, 2008 is incorporated herein by reference.

BACKGROUND OF THE INVENTION

1. Field of the Invention

The present invention relates to an electronic camera. More particularly, the present invention relates to an electronic camera for adjusting a parameter for regulating an image quality based on image data outputted from an image sensor.

2. Description of the Related Art

According to one example of this type of a camera, an image signal outputted from a solid-state imaging element is applied to an AE/AF detection block via an imaging circuit. Based on the applied image signal, the AE/AF detection block detects a luminance and a focal state of an object. Based on the detected luminance and focal state, a control CPU adjusts an exposure amount and a focus. Furthermore, in the above-described camera, a high-resolution mode for recording all pixels without thinning out, and a low-resolution mode for recording the pixels by thinning out are prepared. When a low-luminance object is captured in the low-resolution mode, an extra opened aperture is used. Thereby, the exposure amount of the solid-state imaging element increases, and as a result, the usage frequency of a strobe device is inhibited. However, in the above-described camera, an operation of the AE/AF detection block is not switched between the high-resolution mode and the low-resolution mode. Therefore, there is a possibility that an adjustment accuracy of parameters, such as an exposure amount and a focus, for regulating an image quality may decline in the low-resolution mode.

SUMMARY OF THE INVENTION

An electronic camera according to the present invention, comprises: an imager for respectively outputting N (N: an integer of equal to or more than 2) partial images, each of which partially represents an object scene captured on an imaging surface, from N output terminals, in response to a first clock having a frequency of equal to or less than a first frequency, a processor for respectively performing N predetermined processes that respond to a second clock having a frequency 1/N the frequency of the first clock, on N partial images outputted from the imager; an outputter for outputting an image based on N partial images processed by the processor; a creator for creating an evaluation image based on N partial images outputted from the imager, in response to a third clock; a frequency adjuster for adjusting a frequency of the third clock within a range in which 1/N the fist frequency is an upper limit; and a parameter adjuster for adjusting a parameter for regulating a quality of the image outputted by the outputter, based on the evaluation image created by the creator.

Preferably, the frequency adjuster includes a selector for selecting anyone of the first clock and the second clock as the third clock, a first requestor for requesting the selector to select the first clock when a frequency of the first clock is equal to or less than 1/N of the first frequency, and a second requestor for requesting the selector to select the second clock when a frequency of the first clock is more than 1/N of the first frequency.

Preferably, a resolution of the evaluation image created by the creator depends on a frequency of the third clock.

Preferably, the parameter adjuster includes a distance adjuster for adjusting a distance from an optical lens to the imaging surface based on the evaluation image.

Preferably, the outputter includes a first image outputter for outputting the image toward a monitor, and a second image outputter for outputting the image toward a recording medium.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
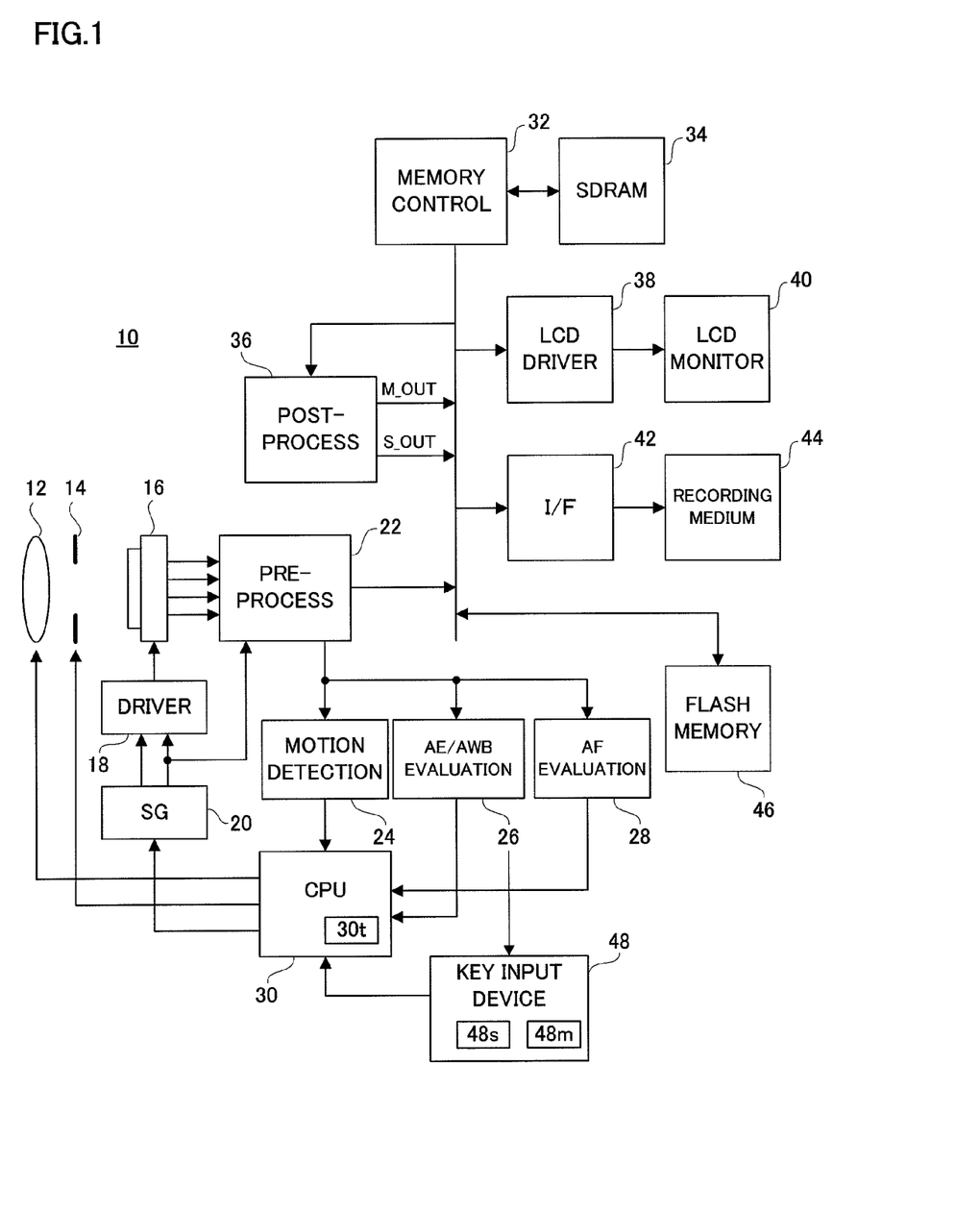
FIG. 1 is a block diagram showing a configuration of one embodiment of the present invention.

With reference to FIG. 1, a digital camera 10 according to this embodiment includes a focus lens 12 and an aperture unit 14. An optical image of an object scene is irradiated onto an imaging surface of a CMOS-type image sensor 16 through these members. The imaging surface has an effective pixel area equivalent to horizontal 2880 pixels×vertical 2160 pixels, and is also covered with a primary color filter (not shown) having a Bayer array. Electric charges produced in each pixel have any one of color information, i.e., R(Red), G (Green), and B (Blue).

An SG (Signal Generator) 20 generates a vertical synchronization signal Vsync and a clock CLK1. A driver 18 exposes the imaging surface in response to the vertical synchronization signal Vsync, and reads out electric charges representing an object scene image in response to the clock CLK1 from the imaging surface. The image sensor 16 has four channels CH1 to CH4, and raw image data based on the readout electric charges is outputted dispersively (in a parallel manner) from the channels CH1 to CH4.

Figure 3:
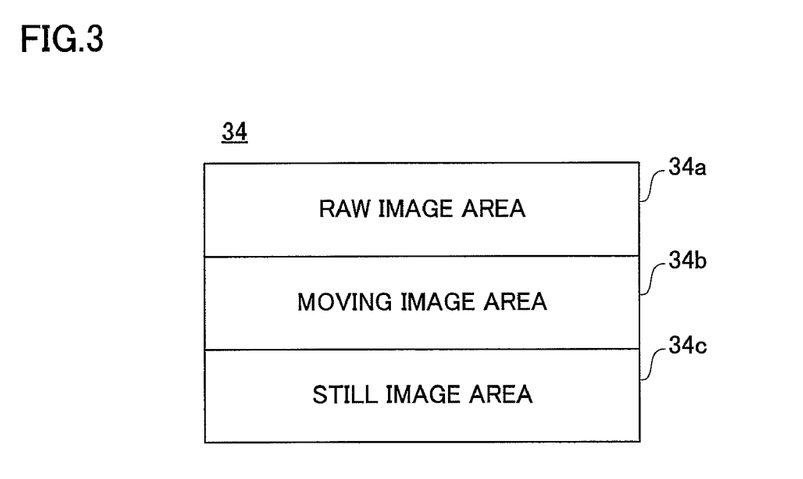
FIG. 3 is an illustrative view showing one example of a mapping state of an SDRAM applied to the embodiment in FIG. 1.

A pre-processing circuit 22 respectively performs a parallel pre-process of four systems on partial raw image data of the four channels outputted from the image sensor 16. The pre-process of each system is configured by digital clamping, pixel defect correction, and gain control, and is executed in response to a clock CLK2 produced by dividing a frequency of the above-described clock CLK1 into ¼. Raw image data obtained by undergoing such a pre-process passes through a memory control circuit 32, and then, is written into a raw image area 34a (see FIG. 3) of an SDRAM 34.

In addition to the above-described pre-process, the pre-processing circuit 22 executes an evaluation-image producing process. The evaluation-image producing process is a process for producing evaluation image data based on the raw image data on which the pre-process is performed, and is executed in response to a clock CLK3 based on the clock CLK1 or CLK2. The evaluation image data thus produced is applied to a motion detecting circuit 24, an AE/AWB evaluating circuit 26, and an AF evaluating circuit 28.

A generating cycle of the vertical synchronization signal Vsync, a resolution of the object scene image read out from the imaging surface, and frequencies of the clocks CLK1 and CLK3 vary depending on each operation mode. As operation modes, there are prepared four operation modes, i.e., modes 0 to 3. A CPU 30 adjusts the generating cycle of the vertical synchronization signal Vsync, the resolution of the object scene image read out from the imaging surface, and the frequencies of the clocks CLK1 and CLK3 by referencing a table 30t shown in FIG. 2. It is noted that for the sake of description, the frequency of the clock CLK2 is also lied on the table 30t.

Figure 2:
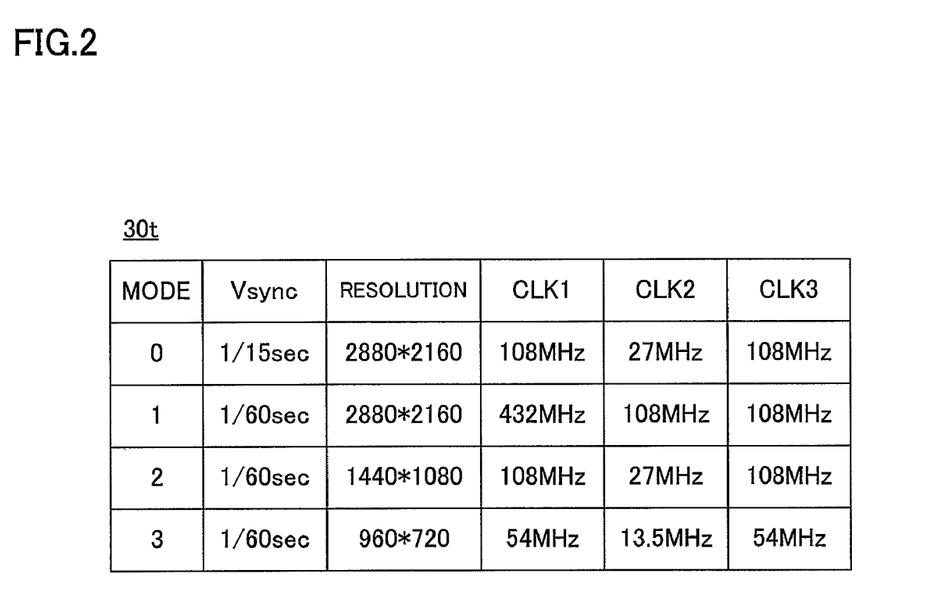
FIG. 2 is an illustrative view showing one example of a table referenced by a CPU applied to the embodiment of FIG. 1.

The generating cycle of the vertical synchronization signal Vsync is adjusted to "$1/15$ seconds" corresponding to the mode 0, and to "$1/60$ seconds" in response to each of the modes 1 to 3. The resolution of the object scene image is adjusted to horizontal 2880 pixels×vertical 2160 pixels corresponding to each of the modes 0 and 1, adjusted to horizontal 1440 pixels× vertical 1080 pixels corresponding to the mode 2, and adjusted to horizontal 960 pixels×vertical 720 pixels corresponding to the mode 3.

The frequency of the clock CLK1 is adjusted to "108 MHz" corresponding to each of the modes 0 and 2, adjusted to "432 MHz" corresponding to the mode 1, and adjusted to "54 MHz" corresponding to the mode 3. The frequency of the clock CLK3 is adjusted to 108 MHz corresponding to each of the modes 0 to 2, and adjusted to 54 MHz corresponding to the mode 3.

When a power source is turned on, a through-image process is executed under the mode 3. From the image sensor 16, the raw image data having a resolution of horizontal 960 pixels×vertical 720 pixels is outputted at every $1/60$ seconds. From the pre-processing circuit 22, the raw image data and the evaluation image data having the same resolution are outputted at every $1/60$ seconds.

Figure 4:
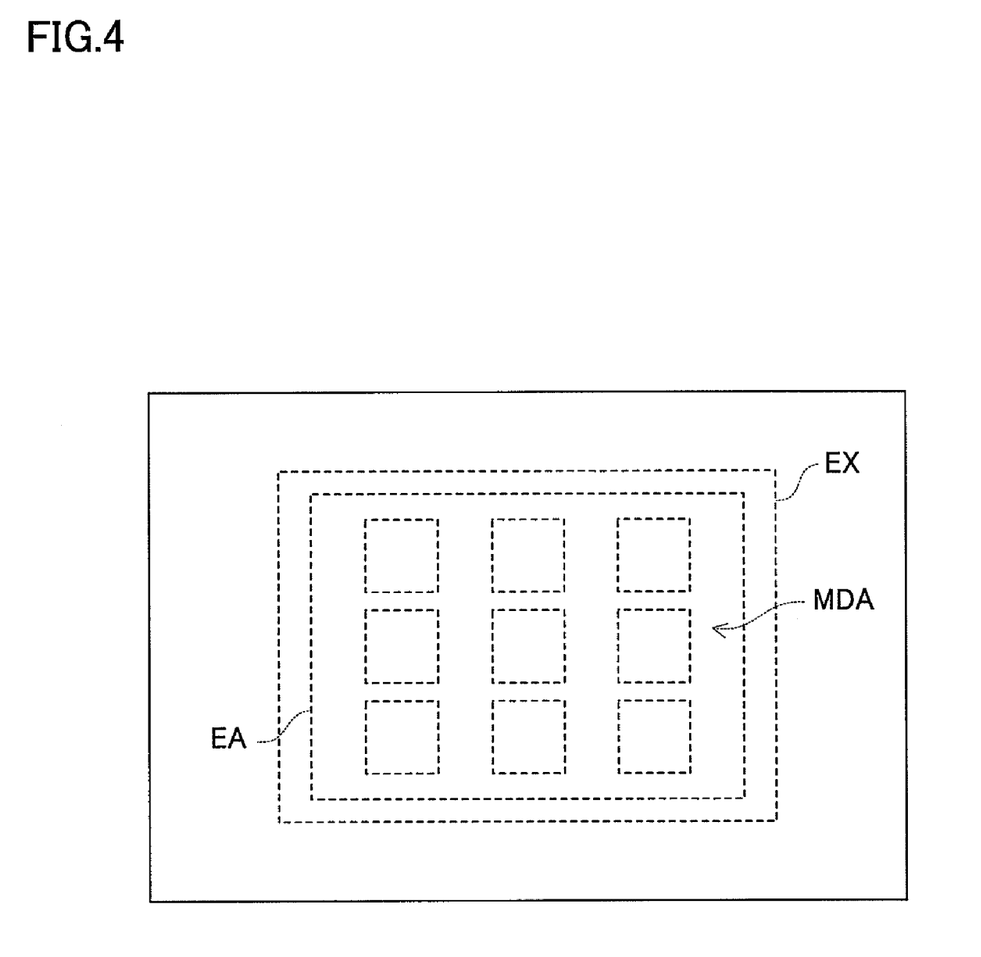
FIG. 4 is an illustrative view showing one portion of an operation of the embodiment in FIG. 1.

With reference to FIG. 4, nine motion detection areas MD1 to MD9, one extraction area EX, and one evaluation area EA are allocated on the imaging surface. The motion detection areas MD1 to MD3 are lined in a horizontal direction on an upper level of the imaging surface, The motion detection areas MD4 to MD6 are lined in a horizontal direction on a middle level of the imaging surface, and the motion detection areas MD7 to MD9 are lined in a horizontal direction on a lower level of the imaging surface.

A motion detecting circuit 24 detects partial motion vectors representing motion of the object scene in each of the motion detection areas MD1 to MD9 based on the evaluation image data applied from the pre-processing circuit 22, and creates a total motion vector by combining together the detected partial motion vectors. Both the detecting process of the partial motion vectors and the creating process of the total motion vector are executed each time the vertical synchronization signal Vsync is generated.

Based on the total motion vector outputted from the motion detecting circuit 24, the CPU 30 determines whether the motion of the imaging surface in a direction perpendicular to an optical axis is caused due to either camera shake or a pan/tilt operation, and when the motion of the imaging surface is caused due to the camera shake, the CPU 30 moves the extraction area EX along the total motion vector. A position of the extraction area EX is changed so that the motion of the imaging surface caused due to the camera shake is compensated (offset).

Of the raw image data accommodated in the raw image area 34a, a post-processing circuit 36 reads out the partial raw image data belonging to the extraction area EX through the memory control circuit 32, and performs processes, such as color separation, white balance adjustment YUV conversion, and reduction zoom, on the read-out partial raw image data. The reduction zoom factor is adjusted appropriately as described later.

The partial raw image data is read out from the raw image area 34a in response to the vertical synchronization signal Vsync, and the image data on which the reduction zoom is performed is also created in response to the vertical synchronization signal Vsync. The created low-resolution image data is outputted from a moving-image output terminal M_OUT, and is written in a moving image area 34b (see FIG. 3) of the SDRAM 34 through the memory control circuit 32.

An LCD driver 38 repeatedly reads out the image data accommodated in the moving image area 34b, and drives an LCD monitor 40 based on the read-out image data As a result, a real-time moving image (through image) representing an object scene is displayed on a monitor screen.

Of the evaluation image data outputted from the pre-processing circuit 22, the AE/AWB evaluating circuit 26 integrates a part of the evaluation image data belonging to the evaluation area EA shown in FIG. 4 each time the vertical synchronization signal Vsync is generated, and outputs an integrated value, i.e., an AE/AWB evaluation value. The CPU 30 executes an AE/AWB process (a simple AE/AWB process) for a moving image in order to calculate an appropriate EV value and an appropriate white balance adjustment gain based on the AE/AWB evaluation value outputted from the AE/AWB evaluating circuit 26. An aperture amount and an exposure time for defining the calculated appropriate EV value are set to the aperture unit 14 and the driver 18, respectively, and the calculated appropriate white balance adjustment gain is set to the post-processing circuit 36. As a result, the brightness and the white balance of the moving image outputted from the LCD monitor 40 are adjusted moderately.

When a shutter button 48s on a key input device 48 is half depressed, the operation mode is changed to the mode 1. The generating cycle of the vertical synchronization signal Vsync, the resolution of the object scene image read out from the image surface, and the frequencies of the clocks CLK1 to CLK3 are as shown in FIG. 2.

From the image sensor 16, raw image data having a resolution of horizontal 2880 pixels×vertical 2160 pixels is outputted at every $1/60$ seconds. From the pre-processing circuit 22, raw image data having a resolution of horizontal 2880 pixels×vertical 2160 pixels, and evaluation image data having a resolution of horizontal 1440 pixels×vertical 1080 pixels are outputted at every 1/60 seconds. Through image based on the raw image data outputted from the pre-processing circuit 22 is displayed continuously on the LCD monitor 40. From the AE/AWB evaluating circuit 26, an AE/AWB evaluation value based on the evaluation image data outputted from the pre-processing circuit 22 is outputted continuously.

The CPU 30 executes a strict AE/AWB process for a still image in order to calculate the optimal EV value and the optimal white balance adjustment gain based on the AE/AWB evaluation value outputted from the AE/AWB evaluating circuit 26 after the shutter button 48s is half depressed. An aperture amount and an exposure time, which define the calculated optimal EV value, are respectively set to the aperture unit 14 and the driver 18 similar to the above-described case. The calculated optimal white balance adjustment gain is also set to the post-processing circuit 36, similar to the above-described case.

When the AE/AWB process for a still image is completed, an AF process based on the output of the AF evaluating circuit 28 is executed. Of the evaluation image data outputted from the pre-processing circuit 22, the AF evaluating circuit 28 integrates a high-frequency component of a part of the evaluation image data belonging to the evaluation area EA shown in FIG. 4 in response to the vertical synchronization signal Vsync, and outputs an integrated value, i.e., the AF evaluation value. With reference to the AF evaluation value outputted from the AF evaluating circuit 28, the CPU 30 searches a focal point by a so-called hill-climbing process. The focus lens 12 is placed at the discovered focal point.

When the shutter button 48s is fully depressed, the CPU 28 changes the operation mode to the mode 0 in order to execute a still-image recording process, and applies an instruction for the still-image recording process to the post-processing circuit 36 and the I/F 42.

From the image sensor 16, raw image data having a resolution of horizontal 2880 pixels×vertical 2160 pixels is outputted at every 1/15 seconds, and also from the pre-processing circuit 22, raw image data having the same resolution is outputted at every 1/15 seconds. Of a plurality of frames of image data produced after the shutter button 48s is fully depressed, the post-processing circuit 36 extracts the image data of a designated number of frames (one frame for a single picture, and five frames for a series of pictures), and outputs the extracted image data from a still-image output terminal S_OUT. The extracted image data is high-resolution image data, which is before the reduction zoom is performed, and is written in a still image area 34c (see FIG. 3) of the SDRAM 34 through the memory control circuit 32. The I/F 42 reads out the image data accommodated in the still image area 34c through the memory control circuit 32, and creates a still image file in which the read-out image data is contained, within the recording medium 44.

When a movie button 48m on the key input device 48 is operated, a moving-image recording process is executed under any one of the modes 1 to 3. The generating cycle of the vertical synchronization signal Vsync, the resolution of the object scene image read out from the imaging surface, and the frequencies of the clocks CLK1 to CLK3 are as shown in FIG. 2.

In the mode 1, raw image data having a resolution of horizontal 2880 pixels×vertical 2160 pixels is outputted at every 1/60 seconds from the image sensor 16, as described above. From the pre-processing circuit 22, raw image data having the same resolution and evaluation image data having a resolution of horizontal 1440 pixels×vertical 1080 pixels are outputted at every 1/60 seconds.

In the mode 2, raw image data having a resolution of horizontal 1440 pixels×vertical 1080 pixels is outputted at every 1/60 seconds from the image sensor 16. From the pre-processing circuit 22, the raw image data and the evaluation image data having the same resolution are outputted at every 1/60 seconds.

In the mode 3, raw image data having a resolution of horizontal 960 pixels×vertical 720 pixels is outputted at every 1/60 seconds from the image sensor 16, as described above. From the pre-processing circuit 22, the raw image data and the evaluation image data having the same resolution are outputted at every 1/60 seconds.

The motion detecting circuit 24, the AE/AWB evaluating circuit 26, and the AF evaluating circuit 28 produce the total motion vector, the AE/AWB evaluation value, and the AF evaluation value, respectively, according to the same manner as described above. Also the CPU 30 moves the extraction area EX based on the total motion vector, according to the same manner as described above, and executes an AE/AWB process for a moving image based on the AE/AWB evaluation value. However, a continuous AF task is initiated with respect to a focus adjustment, and the focal point is searched continuously based on the AF evaluation value.

As a result, image data of a YUV format having a resolution corresponding to a desired mode is written into the moving image area 34b at a cycle corresponding to the desired mode. A moving image based on such image data is displayed on the LCD monitor 40.

The I/F 42 creates a moving image file within the recording medium 44, cyclically reads out the image data accommodated in the moving image area 34b, and writes the read-out image data into the moving image fie within the recording medium 44. When the movie button 48m is operated again, the moving-image recording process is stopped. The I/F 42 ends reading-out of the image data from the moving image area 34b, and closes the moving image fie of a write destination. Thereby, the moving image file is completed. The above-described through-image process is resumed after the moving-image recording process is ended.

The above-described operation of the shutter button 48s is accepted even in the middle of the moving-image recording process, and in response thereto, the still image file is created on the recording medium 44. However, the operation mode is changed in response to the operation of the shutter button 48s, and thus, the reduction zoom factor for a moving image in the post-processing circuit 36 is adjusted in consideration of this mode change.

Figure 5:
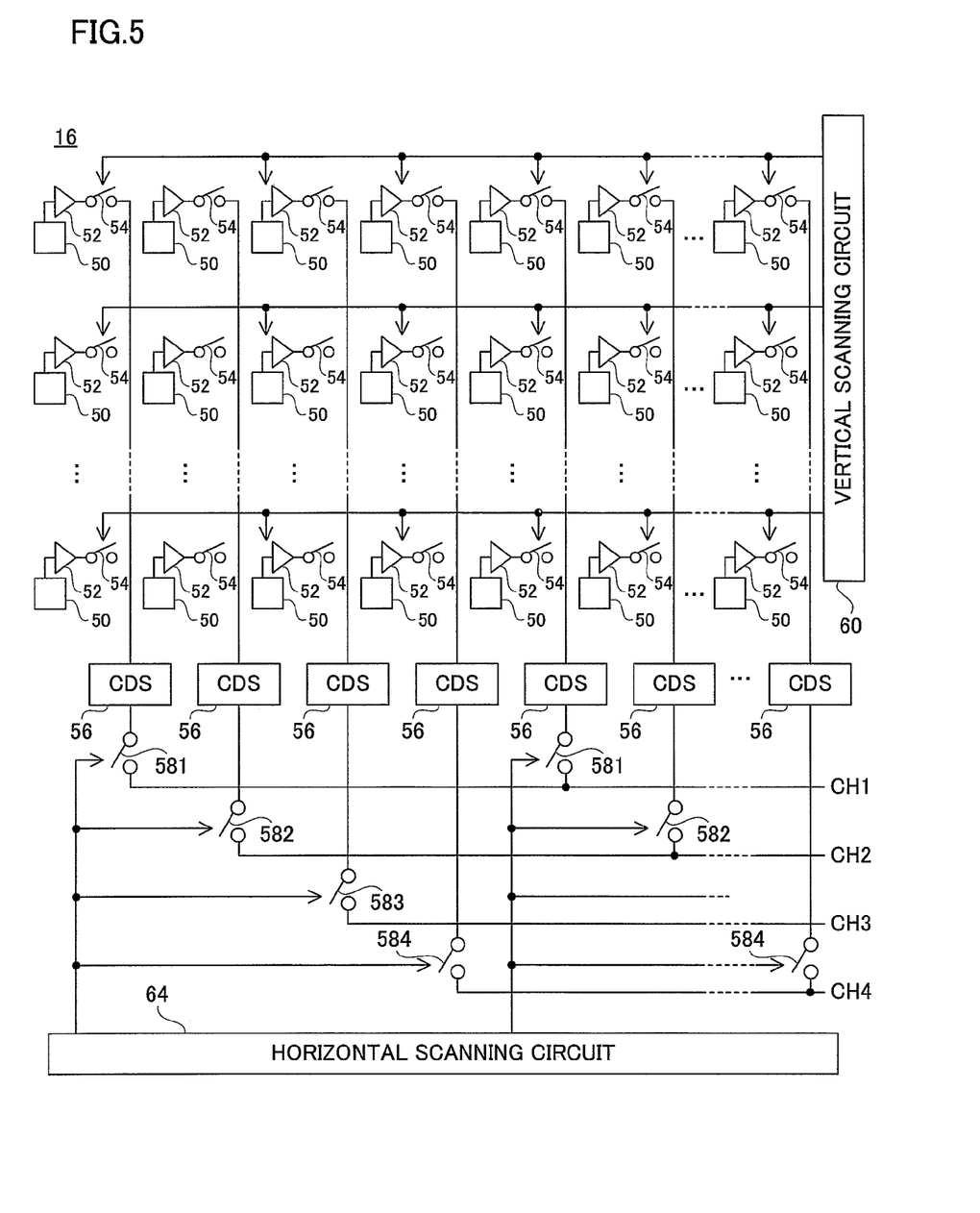
FIG. 5 is a block diagram showing one example of a configuration of an image sensor applied to the embodiment in FIG. 1.

The image sensor 16 is configured as shown in FIG. 5. The electric charges representing the object scene image are produced by a plurality of light-receiving elements 50, 50, ..., placed in a matrix. Each light-receiving element 50 is equivalent to the above-described pixel. Each light-receiving element 50, 50, ..., fined in a vertical direction is connected to a common CDS circuit 56 via an A/D converter 52 and a row selection switch 54. The electric charges produced in the light-receiving elements 50 are converted to 12-bit digital data by the A/D converter 52. A vertical scanning circuit 60 executes an operation for turning on/off, for each pixel, row selection switches 54, 54, ..., in a raster scanning manner. Noise included in the pixel data that has undergone the row selection switch 54 in an on state is removed by the CDS circuit 56.

A column selection switch 58₁ is allocated to the CDS circuit 56 at a (4N+1)th column (N: 0, 1, 2, 3, ...), a column selection switch 58₂ is allocated to the CDS circuit 56 at a (4N+2)th column, a column selection switch 58₃ is allocated to the CDS circuit 56 of a (4N+3)th column, and a column selection switch 584 is allocated to the CDS circuit 56 of a (4N+4)th column A horizontal scanning circuit 64 turns on the column selection switch 581 at a timing at which the row selection switch 54 at the (4N+1)th column is turned on, turns on the column selection switch 582 at a timing at which the row selection switch 54 at the (4N+2)th column is turned on, turns on the column selection switch 583 at a timing at which the row selection switch 54 at the (4N+3)th column is tuned on, and turns on the column selection switch 584 at a timing at which the row selection switch 54 at the (4N+4)th column is turned on.

As a result, the partial raw image data based on the electric charges produced in the light-receiving element 50 at the (4N+1)th column is outputted from the channel CH1, and the partial raw image data based on the electric charges produced in the light-receiving element 50 at the (4N+2)th column is outputted from the channel CH2. Also, the partial raw image data based on the electric charges produced in the light-receiving element 50 at the (4N+3)th column is outputted from the channel CH3, and the partial raw image data based on the electric charge produced in the light-receiving element 50 at the (4N+4)th column is outputted from the channel CH4.

Figure 6:
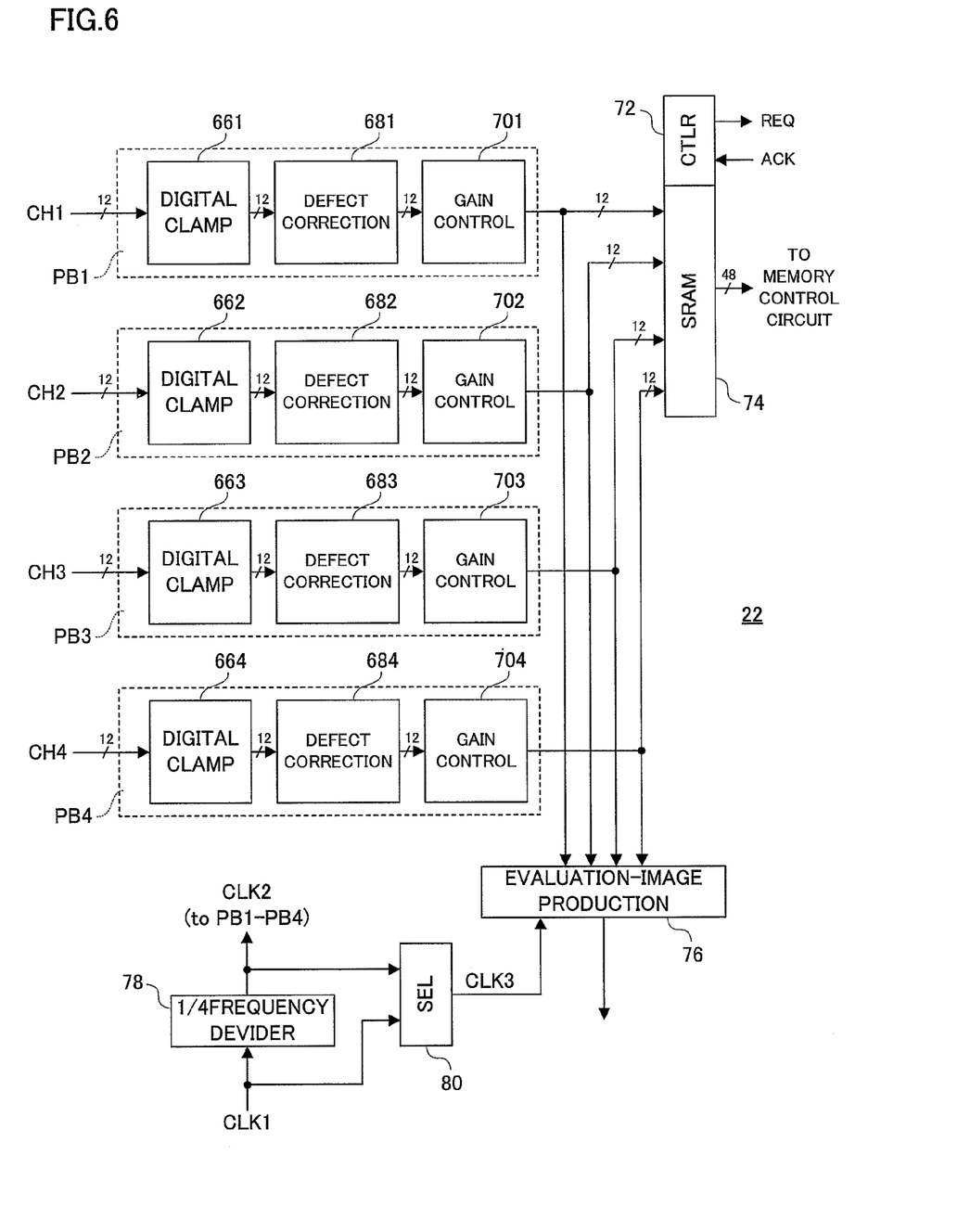
FIG. 6 is a block diagram showing one example of a configuration of a pre-processing circuit applied to an embodiment in FIG. 1.

The pre-processing circuit 20 is configured as shown in FIG. 6. The partial raw image data of the channel CH1 is applied to a pre-processing block PB1, and the partial raw image data of the channel CH2 is applied to a pre-processing block PB2. The partial raw image data of the channel CH3 is applied to a pre-processing block PB3, and the partial raw image data of the channel CH4 is applied to a pre-processing block PB4.

On the other hand, a frequency divider 78 divides the frequency of the clock CLK1 outputted from SG20 into ¼, and applies the clock CLK2 having a frequency ¼ the frequency of clock CLK1, to the pre-processing blocks PB1 to PB4.

The pre-processing block PB1 is configured by a digital clamp circuit 661, a pixel-defect correcting circuit 681, and a gain control circuit 701, while the pre-processing block PB2 is configured by a digital clamp circuit 662, a pixel-defect correcting circuit 682, and a gain control circuit 702. Furthermore, the pre-processing block PB3 is configured by a digital clamp circuit 663, a pixel-defect correcting circuit 683, and a gain control circuit 703, while the pre-processing block PB4 is configured by a digital clamp circuit 664, a pixel-defect correcting circuit 684, and a gain control circuit 704.

Therefore, the partial raw image data of either channel is subjected to a series of processes such as digital clamping, pixel defect correction, and gain control, in response to the clock CLK2. The partial raw image data outputted from the pre-processing blocks PB1 to PB4 are thereafter written into an SRAM 74. A controller 72 issues a write request toward the memory control circuit 32 each time an amount of data accommodated in the SRAM 74 reaches a threshold value, and outputs the raw image data of a predetermined amount toward the memory control circuit 32 when an acknowledge signal is sent back from an issuance destination.

The partial raw image data of the four channels respectively outputted from the pre-processing blocks PB1 to PB4 are also applied to an evaluation-image producing circuit 76. A selector 80 selects one of the clocks CLK1 and CLK2, and applies the selected clock, as the clock CLK3, to the evaluation-image producing circuit 76. A selecting manner of the selector 80 is controlled by the CPU 30, and the frequency of the clock CLK3 is adjusted corresponding to each of the modes 0 to 3 according to a manner shown in FIG. 2. That is, the frequency of the clock CLK3 is adjusted within a range in which 108 MHz is the upper limit.

The evaluation-image producing circuit 76 executes a sampling process in response to the clock CLK3, and produces evaluation image data based on the partial raw image data of the four channels. The resolution of the evaluation image data thus produced depends upon the frequency of the clock CLK3. That is, the evaluation image data has a resolution of horizontal 2880 pixels×vertical 2160 pixels in the mode 0, a resolution of horizontal 1440 pixels×vertical 1080 pixels in the mode 1, a resolution of horizontal 1440 pixels×vertical 1080 pixels in the mode 2, and a resolution of horizontal 960 pixels×vertical 720 pixels in the mode 3.

Figure 7:
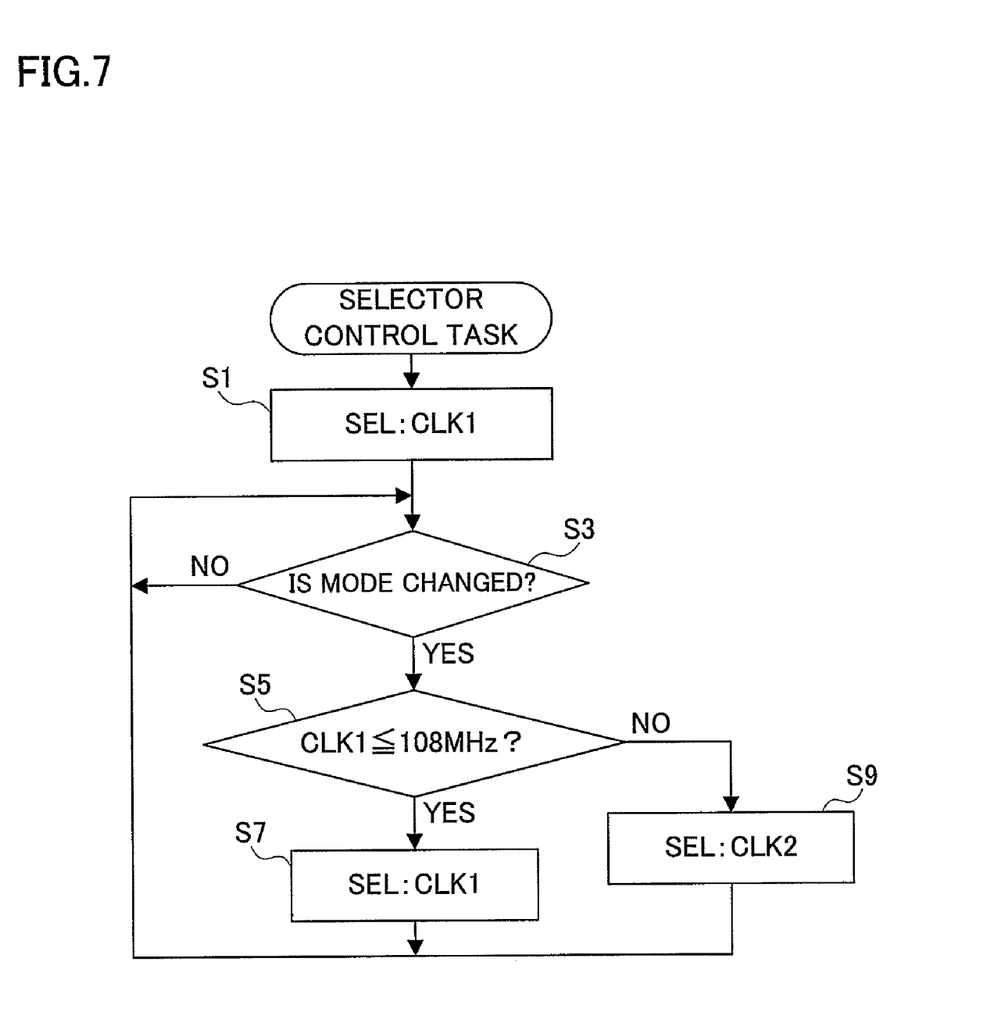
FIG. 7 is a flowchart showing one portion of an operation of a CPU applied to the embodiment in FIG. 1.
Figure 8:
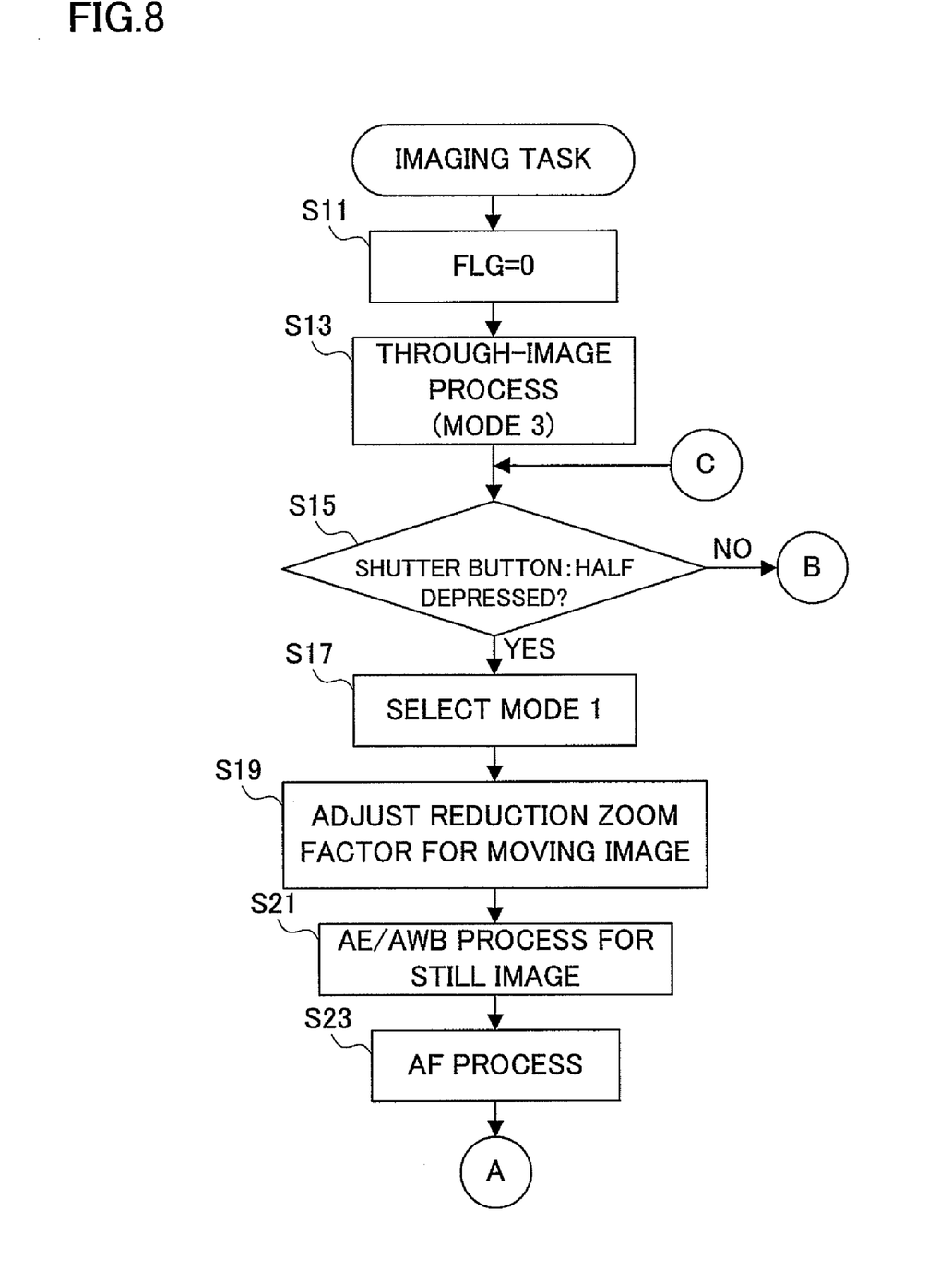
FIG. 8 is a flowchart showing another portion of the operation of the CPU applied to the embodiment in FIG. 1.
Figure 9:
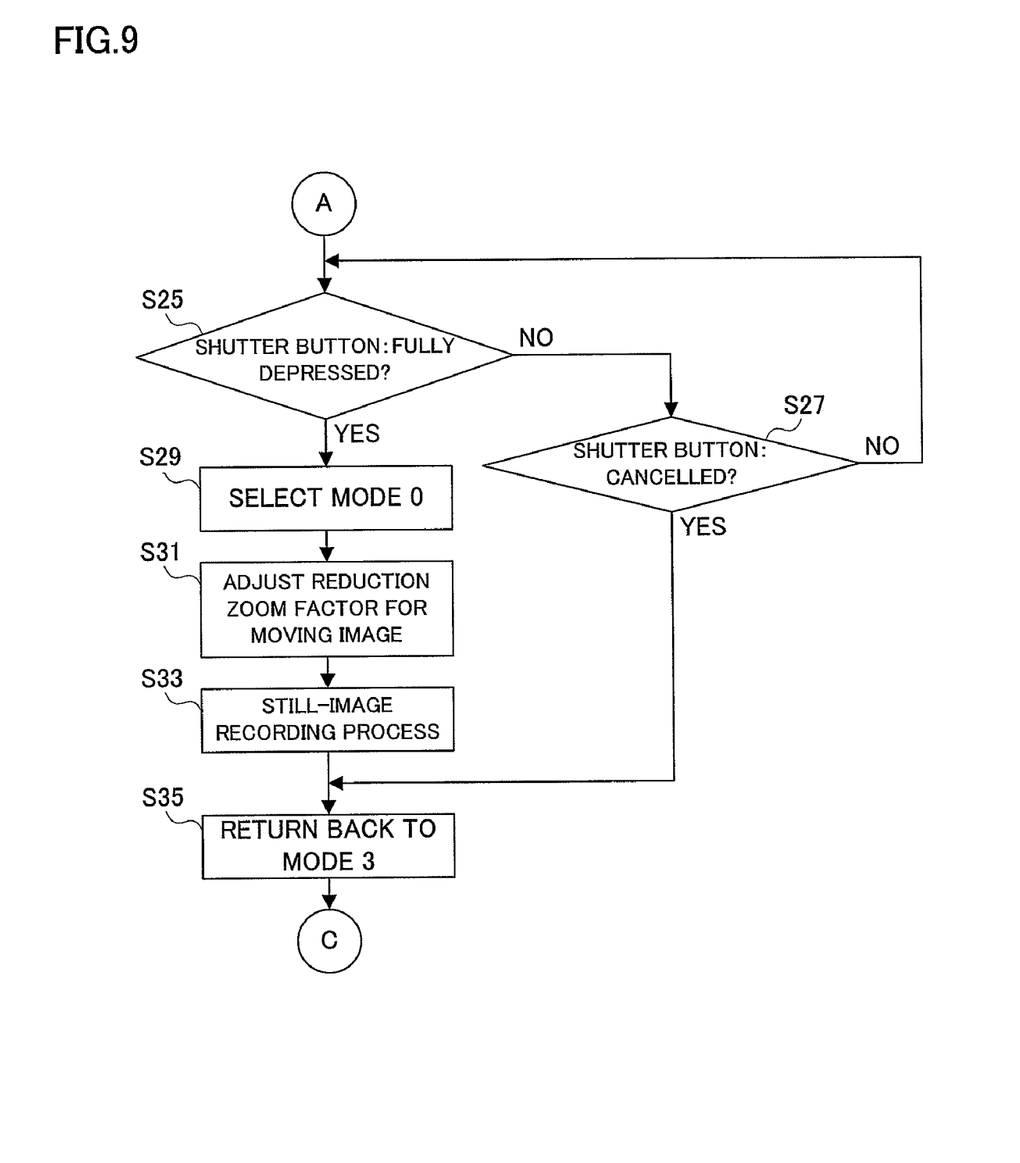
FIG. 9 is a flowchart showing still another portion of the operation of the CPU applied to the embodiment in FIG. 1.
Figure 10:
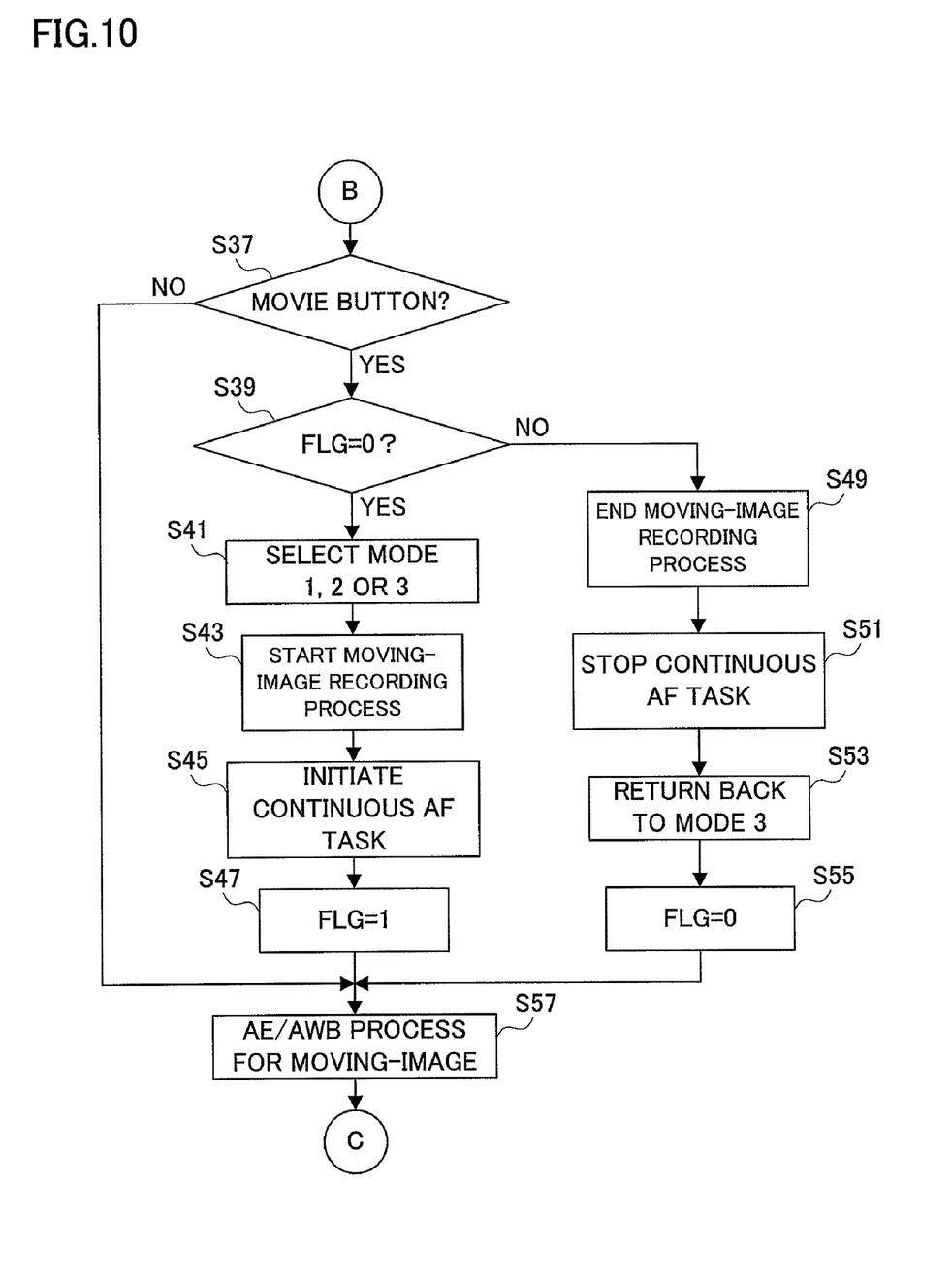
FIG. 10 is a flowchart showing yet still another portion of the operation of the CPU applied to the embodiment in FIG. 1.

The CPU 28 executes a plurality of tasks, including a selector control task shown in FIG. 7 and an imaging task shown in FIG. 8 and FIG. 9, in a parallel manner. It is noted that control programs corresponding to these tasks are stored in a flash memory 46.

With reference to FIG. 7, in a step S1, the selection of the clock CLK1 is requested to the selector 80 in order to comply with the mode 3. When the mode is changed, YES is determined in a step S3, and it is determined whether or not the frequency of the clock CLK1 corresponding to the changed mode is equal to or less than 108 MHz in a step S5. When YES is determined in this step, the process proceeds to a step S7, while NO is determined, the process proceeds to a step S9. In the step S7, the selection of the clock CLK1 is requested to the selector 80, while in the step S9, the selection of the clock CLK2 is requested to the selector 80. Upon completion of the process in the step S7 or S9, the process returns to the step S3.

With reference to FIG. 8, in a step S11, a flag FLG for identifying whether or not the moving-image recording process is being executed is set to "0". In a step S13, the through-image process is started under the mode 3. As a result, the raw image data having a resolution of horizontal 2880 pixels× vertical 2160 pixels is outputted from the image sensor 16 at every 1/15 seconds, and the through image based on this raw image data is outputted from the LCD monitor 40.

In a step S15, it is determined whether or not the shutter button 48s is half depressed, and in a step S37, it is determined whether or not the movie button 48m is operated. When NO is determined in the both steps, the AE/AWB process for a moving image in a step S57 is repeated. As a result, the brightness and the white balance of the through image are adjusted moderately.

When the shutter button 48s is half depressed, YES is determined in the step S15, and the mode 1 is selected in the step S17. The determination result of the step S3 shown in FIG. 7 is updated from NO to YES in response to this process. In a step S19, the reduction zoom factor for a moving image, referenced in the post-processing circuit 36, is adjusted. Upon completion of the adjustment, the AE/AWB process for a still image and the AF process are executed in steps S21 and S23, respectively, and thereafter, the process proceeds to a step S25. As a result of the AE/AWB process for a still image, the brightness and white balance of the through image are adjusted to the optimum value, and as a result of the AF process, the focus lens 12 is placed at the focal point.

In the step S25, it is determined whether or not the shutter button 48s is fully depressed, and in a step S27, it is determined whether or not the operation of the shutter button 48s is cancelled. When YES is determined in the step S25, the mode 0 is selected in a step S29. The determination result of the step S3 shown in FIG. 7 is updated from NO to YES also when this process is executed. In a step S31, the reduction zoom factor for a moving image, referenced in the post-processing circuit 36, is adjusted. Upon completion of the adjustment, the still-image recording process is executed in a step S33, and the process is returned back to the mode 3 in a step S35, and thereafter, returns to the step S15. On the other hand, when YES is determined in the step S27, the process undergoes the step S35, and then, returns to the step S15.

When the movie button 48m is operated, YES is determined in a step S37, and a state of the flag FLG is determined in a step S39. When the flag FLG is "0", the process undergoes steps S41 to S47, and then, proceeds to a step S57. On the other hand, when the flag FLG is "1", the process undergoes steps S49 to S55, and then, proceeds to a step S57.

In the step S41, any one of the modes 1 to 3 is selected. The determination result of the step S3 shown in FIG. 7 is updated from NO to YES also when this process is executed. In a step S43, the moving-image recording process is started, and in the step S45, the continuous AF task is initiated. In the step S47, the flag FLG is updated to "1".

In the step S49, the moving-image recording process is ended, and in the step S51, the continuous AF task is stopped. In the step S53, the current mode is returned back to the mode 3, and in the step S55, the flag FLG is updated to "0". The determination result of the step S3 shown in FIG. 7 is updated from NO to YES in response to the process in the step S53.

As can be understood from the above description, in response to the clock CLK1 (first clock) having a frequency of equal to or less than 432 MHz (first frequency), the image sensor 16 respectively outputs N (N: an integer of equal to or more than 2) partial images, each of which partially represents the object scene captured on the imaging surface, from N of channels. The pre-processing blocks PB1 to PB4 perform N pre-processes that respond to the clock CLK2 (second clock) having a frequency 1/N the frequency of clock CLK1, on N partial images outputted from the image sensor 16, respectively. The LCD monitor 40 outputs the image based on N partial images processed by the pre-processing circuit 22. The evaluation-image producing circuit 76 creates the evaluation image based on N partial images outputted from the image sensor 16, in response to the clock CLK3 (third clock). The CPU 30 adjusts the frequency of the clock CLK3 within a range in which 1/N of 432 MHz is the upper limit (S7 and S9). Furthermore, the CPU 30 adjusts the parameter for regulating the quality of the image outputted from the LCD monitor 40 based on the evaluation image created by the evaluation-image producing circuit 76 (S21, S23, S45, and S57).

Thus, N partial images are outputted from the image sensor 16 in response to the clock CLK1 having a frequency of equal to or less than 432 MHz. The resultant images are respectively subjected to N pre-processes that respond to the clock CLK2 having a frequency 1/N the frequency of the clock CLK1. Furthermore, the frequency of the clock CLK3 that is referenced for creating the evaluation image based on N partial images is adjusted within a range in which 1/N of 432 MHz is the upper limit.

As a result, both the clocks CLK2 and CLK3 have a frequency equal to or less than 1/N of 432 MHz, and thus, it becomes possible that the pre-processing blocks PB1 to PB4 and the evaluation-image producing circuit 76 are arranged in the common circuit. Also, even when the frequency of the clock CLK1 falls below 432 MHz, and the frequency of the clock CLK2 falls below 1/N of 432 MHz, it is possible to set the frequency of the clock CLK3 to 1/N of 432 MHz. Therefore, it becomes possible to increase the resolution of the evaluation image data as high as possible, and also possible to suppress a decline in the adjustment accuracy of the parameter for regulating the image quality.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
    an imager which respectively outputs N (N: an integer of equal to or more than 2) partial images, each of which partially represents a scene captured on an imaging surface, from N output terminals, in response to a first clock having a frequency of equal to or less than a first frequency;
    a processor which respectively performs N predetermined processes that respond to a second clock having a frequency 1/N the frequency of the first clock, on N partial images outputted from said imager;
    an outputter which outputs an image based on N partial images processed by said processor;
    a creator which creates an evaluation image based on N partial images outputted from said imager, in response to a third clock;
    a frequency adjuster which adjusts a frequency of the third clock within a range in which 1/N the first frequency is an upper limit; and
    a parameter adjuster which adjusts a parameter for regulating a quality of the image outputted by said outputter, based on the evaluation image created by said creator.

2. An electronic camera according to claim 1, wherein said frequency adjuster includes a selector which selects anyone of the first clock and the second clock as the third clock a first requestor which requests said selector to select the first clock when a frequency of the first clock is equal to or less than 1/N of the first frequency, and a second requestor which requests said selector to select the second clock when a frequency of the first clock is more than 1/N of the first frequency.

3. An electronic camera according to claim 1, wherein a resolution of the evaluation image created by said creator depends on a frequency of the third clock.

4. An electronic camera according to claim 1, wherein said parameter adjuster includes a distance adjuster which adjusts a distance from an optical lens to said imaging surface based on the evaluation image.

5. An electronic camera according to claim 1, wherein said outputter includes a first image outputter which outputs the image toward a monitor, and a second image outputter which outputs the image toward a recording medium.

* * * * *